United States Patent Office
3,755,362
Patented Aug. 28, 1973

3,755,362
PROCESS OF MAKING 2,3-DIHYDRO-P-DITHIINS AND THEIR SULFOXIDES AND SULFONES
Friedrich Asinger, Aachen, and Paul Scherberich, Neu Isenburg, Germany, assignors to Deutsche Gold- und Silber-Scheideanstalt vormals Roessler, Frankfurt am Main, Germany
No Drawing. Filed Nov. 17, 1970, Ser. No. 97,402
Claims priority, application Germany, Nov. 18, 1969, P 19 57 860.0
Int. Cl. C07d 73/00
U.S. Cl. 260—327 P                 10 Claims

ABSTRACT OF THE DISCLOSURE 2,3-dihydro-p-dithiins are made by reacting an α-mercaptooxo compound or a dimer thereof with an equimolar amount of a thiirane in the presence of an inert organic solvent and in the presence of a base at a temperature between about 0 and 100° C., thereby forming the addition product of the α-mercaptooxo compound and the thiirane; and then effecting the cyclization of the said addition product. The thus-formed 2,3-dihydro-p-dithiin may then be oxidized to the sulfoxide or sulfone.

The products are useful as antioxidants in synthetic materials and can be made at higher yields and at higher purity by the above process.

BACKGROUND OF THE INVENTION

Only a few specific compounds have heretofore been described in the group of dihydro-p-dithiins. For instance, 2,3-dihydro-p-dithiin has been made by reaction of 1,2-dimercaptoethane with bromacetaldehyde diethylacetal (J. Am. Chem. Soc. 77, 1169 [1955]). 2,5-diethoxy-p-dithiane has also been converted by passing the compound over aluminum oxide at 260° C. so as to form 2,3-dihydro-2-ethoxy-p-dithiin (J. Org. Chem., 24, 1819 [1959]). The making of 2,3-dihydro-2-acetoxy-p-dithiin by pyrolysis of 2,5-diacetoxy-p-dithiane has also been described (Chem. Ber., 85, 924 [1952]).

These prior-art disclosures, however, are limited to the making of a few compounds from this group of compounds and did not involve industrially useful processes. No process of general applicability has heretofore become known for all required types of 2,3-dihydro-p-dithiins.

SUMMARY OF THE INVENTION

The invention resides in a process for making generally dithiins which involve the steps of reacting a α-mercaptooxo compound or a dimer thereof with an equimolar amount of a thiirane in the presence of an inert organic solvent and in the presence of a base at a temperature between about 0 and 100° C., whereby the addition product of the α-mercaptooxo compound and the thiirane is formed whereupon the addition product is then subjected to cyclization. This cyclization can be effected in the presence of an inert organic solvent and an acid catalyst, preferably upon heating or, at room temperature, by reaction with equimolar amounts of anhydrous zinc chloride or phosphorus pentoxide in an inert organic solvent. The formed 2,3-dihydro-p-dithiin may then be oxidized to the sulfoxide or sulfone.

DETAILED DESCRIPTION OF THE INVENTION AND OF SPECIFIC EMBODIMENTS

Preferably the reaction between the mercaptooxo compound and the thiirane is effected at a temperature between about 25 and 30° C. The thus-formed addition product may then be isolated and subjected to purification prior to the reaction, for instance in an inert solvent and in the presence of an acid catalyst to effect its cyclization.

The process of the invention makes it possible to obtain good yields at a high degree of purity of p-dithiins and the corresponding sulfones and sulfoxides of the following formulae:

The products are valuable as antioxidants in synthetic materials.

The inert solvents for the reaction between the α-mercaptooxo compound and the thiirane may for instance be hydrocarbons such as benzene, toluene, xylene, and furthermore dioxane, tetrahydrofuran, chloroform, ether, dimethylformamide, etc. Alcohols are particularly useful. Among them methanol is preferred.

The basic catalysts for the reaction in the first stage of the process may be bases like alkali hydroxides, particularly potassium hydroxide, alcoholates, carbonates, bicarbonates, organic bases such as tertiary amines or pyridine or quaternary nitrogen bases. These bases may be employed in amounts between 0.5 and 10% by weight, preferably between 1 and 2% by weight relative to the amount of α-mercaptooxo compound.

As α-mercaptooxo compounds, all compounds can be used which include the unit $$-\underset{|}{C}=O$$
$$-\underset{}{C}H-SH$$

Preferred are compounds of the general formula $$R^1-\underset{|}{C}=O$$
$$R^2-\underset{}{C}H-SH$$

In this formula $R^1$ and $R^2$ may be the same or different and are hydrogen, alkyl of 1 to 18 carbon atoms, aryl, aralkyl, heteroaryl, —COOH— or —COOR—. $R^1$ and $R^2$ may also form together a ring which may include an O-, S-, N- or P-atom and may have between 4 and 12 members. The listed groups may also be substituted by halogen, particularly chlorine, or $$-CN, -COOR, -OR, -SR, -N\diagdown^R_R$$

or an OH group. R in all these groups is understood to be alkyl of 1–12 carbon atoms. $R^1$ and $R^2$, however, may also be —COOMe, —CONRR, —CONHR or —CONH₂, Me being an alkali metal atom, preferably sodium.

Examples of such compounds are for instance: mercaptobutanones, mercaptopentanones, mercaptoacetone, mercaptocyclohexanone, mercaptocyclooctanone, mercaptocyclododecanone, mercaptoacetophenone, mercaptopyruvic acid ester, mercaptomethylbenzylketone, mercaptoacetylacetic acid ester and compounds of the formula $$R^1-\underset{|}{C}=O$$
$$R^2-\underset{}{C}H-SH$$

wherein $R^1$ and $R^2$ are the same or different and are hydrogen, alkyl of 1 to 18 carbon atoms, or phenyl, or together form an alkylene chain of up to 10 carbon atoms.

As thiiranes there may be used in the present process all compounds which involve the unit For instance, such compounds may have the general formula

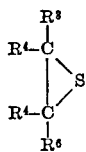

in which $R^3$, $R^4$, $R^5$ and $R^6$ are the same or different and signify hydrogen or a straight or branched aliphatic group of 1–18 carbon atoms. These groups can for instance be substituted by halogen, particularly chlorine, or by —SH, —SR, —OH, —OR, —SCN, —NRR or also by an acid or ester group. R in these groups is a lower alkyl group or is aryl, preferably phenyl. $R^3$, $R^4$, $R^5$ and $R^6$ may also be aryl or aralkyl or cycloaliphatic ring groups. $R^3$ and $R^5$, as well as $R^4$ and $R^6$, may also together form a cycloaliphatic ring of 4 to 12 members.

Specific examples of such compounds are isobutylenesulfide, dodecylenesulfide, cyclopentenesulfide, cyclohexenesulfide, cyclododecenesulfide, 2,3-epithiopropanol, 3-chloropropylenesulfide, methoxymethylthiirane, phenoxymethylthiirane, mercaptomethylthiirane, diethylaminomethylthiirane, epithio carboxylic acids and their esters, ethylenesulfide, propylenesulfide, methylthioethylenesulfide, 2,3-butylenesulfide, 1-oxypropane-2,3-sulfide.
fide, 2,3-butylenesulfide, 1-oxypropane-2,3-sulfide and compounds of the formula

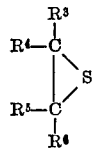

wherein $R^3$, $R^4$, $R^5$ and $R^6$ are the same or different and are hydrogen, alkyl of 1 to 18 carbon atoms or di-lower-alkyl-amino-alkyl wherein the alkyl portion contains 1 to 18 carbon atoms or $R^3$ and $R^5$ or $R^4$ and $R^6$ may together form an alkylene chain of up to 10 carbon atoms.

For carrying out the first stage of the process, it is preferable to put the base in solution and then add thereto the thiirane while stirring and possibly upon cooling, in order to remain between the indicated temperature range.

There are thus at first obtained addition products from the α-mercaptooxo compound and the thiirane which have the structure

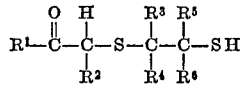

wherein $R^1$ and $R^2$ are the same or different and are hydrogen, alkyl of 1 to 18 carbon atoms, or phenyl, or together form an alkylene chain of up to 10 carbon atoms, $R^3$, $R^4$, $R^5$ and $R^6$ are the same or different and are hydrogen, alkyl of 1 to 18 carbon atoms or di-lower-alkyl-amino-alkyl wherein the alkyl portion contains 1 to 18 carbon atoms or $R^3$ and $R^5$ or $R^4$ and $R^6$ may together form an alkylene chain of up to 10 carbon atoms and which are obtained at this point already with sufficient purity that in most cases their separation and purification is not necessary. The obtained product thus may be passed directly into the cyclization phase after distilling off the solvent.

The cyclization is preferably effected upon heating in an organic solvent such as benzene, xylene, chloroform, toluene or carbon tetrachloride in the presence of an acid catalyst such as p-toluene sulfonic acid, methane sulfonic acid, orthophosphoric acid, mineral acids, a Lewis acid, or acid salts such as alkali hydrogen sulfates or acid-exchange resins, molecular sieves while using a water trap.

The temperature range in this second step may be between 50 and 150° C. and preferably the reaction is carried out by adding the addition product into a boiling solution of the acid catalyst in the organic solvent.

The cyclization can also be effected by treatment with equimolar amounts of anhydrous zinc chloride or phosphorus pentoxide in an inert organic solvent at room temperature.

The conversion of the 2,3-dihydro-p-dithiin into the corresponding sulfone or sulfoxide is carried out with the usual oxidizing agents such as $H_2O_2$, hydroperoxides, peracids, permanganates in acetic acid ester, acetone or preferably glacial acetic acid.

The following examples will further illustrate the invention.

Example 1

59 g. (0.5 mole) of 2-mercaptopentanone-(3) and 0.25 g. potassium hydroxide were dissolved in 100 ml. methanol. 30 g. (0.5 mole) of ethylene sulfide were then added dropwise at room temperature up to a maximum temperature of 28° C. while vigorously stirring. After about one hour the exothermic reaction is complete. The stirring is then continued at room temperature for another thirty minutes. After distilling off the solvent, a small amount of colorless solid polyethylene sulfide is removed by filtration. The residue consists of 2-(β-mercaptoethyl)-mercaptopentanone-(3).

This linear addition product was then subjected to condensation without prior distillation. The crude product is added dropwise within a period of half an hour to a boiling solution of 2 g. of p-toluene sulfonic acid in 250 ml. xylene while stirring. After complete elimination of the condensation water in the water trap, the reaction mixture is cooled and several times washed with water. The residue is fractionated in a vacuum after distilling off the solvent. There were thus obtained 54.5 g. (68% of the theoretical value) of 2,3 - dihydro - 5-methyl-6-ethyl-p-dithiin in the form of a colorless liquid having the boiling point 68.5° C./0.8 mm.

Example 2

59 g. (0.5 mole) of 2-mercaptopentanone-(3) were dissolved in 100 ml. methanol and 0.25 g. of potassium hydroxide were added. Within a period of 1 hour, 37 g. (0.5 mole) of propylenesulfide were then added dropwise to the solution at a temperature between 25 and 28° C. while vigorously stirring. The further treatment of the reaction mixture was the same as in Example 1.

There were obtained 71.5 g. (82% of the theoretical value) of 2,5-dimethyl-2,3-dihydro-6-ethyl-p-dithiin in the form of a colorless liquid of the boiling point of 74° C./0.8 mm.

Example 3

The same reaction was carried out as in Example 2 using 50.2 g. (0.3 mole) of 1-phenyl-2-mercaptopropanone-(1) and 22.4 g. (0.3 mole) of propylene sulfide. There were thus obtained 52 g. (78.2% of the theoretical value) of 2,5-dimethyl-2,3-dihydro-6-phenyl-p-dithiin as a colorless liquid of the boiling point 111° C./0.13 mm.

Example 4

23.5 g. (0.2 mole) of 2-mercaptocyclopentanone-(1) and 14.8 g. (0.2 mole) propylene sulfide were reacted as described in Example 2. There were obtained 30.5 g. (88% of the theoretical value) of 2-methyl-2,3-dihydro-5,6-trimethylene-p-dithiin as a colorless liquid of the boiling point of 80° C./0.55 mm.

Example 5

23.6 g. (0.2 mole) of 2-mercaptopentanone-(3) and 22.8 g. (0.2 mole) of cyclohexenesulfide were reacted as described in Example 2. There were obtained 23.8 g. (66% of the theoretical value) of 2,3-tetramethylene-2,3-dihydro-5-methyl-6-ethyl-p-dithiin in the form of a faintly yellow liquid having a boiling point of 97° C./0.15 mm.

Example 6

23.5 g. (0.2 mole) of 2-mercaptocyclopentanone-(1) and 22.8 g. (0.2 mole) of cyclohexenesulfide were reacted as described in Example 2. There were obtained 35 g. (82.5% of the theoretical value) of 2,3-tetramethylene-2,3-dihydro-5,6-trimethylene-p-dithiin having a boiling point of 100° C./0.05 mm. (M.P. 39° C.).

Example 7

35.4 g. (0.3 mole) of 2-mercaptopentanone-(3) were reacted with 43.5 g. (0.3 mole) of 2-diethylamino-methyl-thiirane at 25–28° C. as described in Example 2. The condensation of the linear addition salt was carried out in the presence of 0.3 mole (29.5 g.) of 85%-concentration orthophosphoric acid. After cooling off of the condensation mixture 12 g. (0.3 mole) of sodium hydroxide dissolved in 20 ml. water was added in order to free the amine.

There were obtained 61.5 g. (83.5% of the theoretical value) of 2-diethylaminomethyl-2,3-dihydro-5-methyl-6-ethyl-p-dithiin of a yellow viscous oil having a boiling point of 93.5° C./0.08 mm.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. The process of making 2,3-dihydro-p-dithiins comprising the steps of reacting as α-mercaptooxo compound of the formula

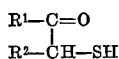

wherein $R^1$ and $R^2$ are the same or different and are hydrogen, alkyl of 1 to 18 carbon atoms, or phenyl or together form an alkylene chain of up to 10 carbon atoms, with an equimolar amount of a thiirane of the formula

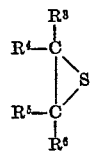

wherein $R^3$, $R^4$, $R^5$ and $R^6$ are the same or different and are hydrogen, alkyl of 1 to 18 carbon atoms or di-lower-alkyl-amino-alkyl wherein the alkyl portion contains 1 to 18 carbon atoms or $R^3$ and $R^5$ or $R^4$ and $R^6$ may together form an alkylene chain of up to 10 carbon atoms, in the presence of an inert organic solvent and in the presence of a base at a temperature between about 0 to 100° C., thereby forming the addition product of the α-mercaptooxo compound and the thiirane; and then effecting the cyclization of the addition product in the presence of an inert organic solvent and an acid catalyst or by reaction with an equimolar amount of anhydrous zinc chloride or phosphorus pentoxide in an inert organic solvent so as to form the 2,3-dihydro-p-dithiin.

2. The process of claim 1, wherein the said addition product has unit formula

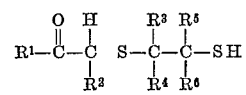

$R^1$ to $R^6$ having the meaning as in claim 1.

3. The process of claim 1, wherein the cyclization with the acid catalyst is carried out upon heating of the reaction mass or is carried out at room temperature upon employing the anhydrous zinc chloride or phosphorus pentoxide.

4. The process of claim 1, wherein the reaction between the α-mercaptooxo compound and the thiirane is carried out at a temperature between 25 and 30° C.

5. The process of claim 1, wherein the organic solvent employed in the reaction between the mercaptooxo compound and the thiirane is methanol.

6. The process of claim 1, wherein the acid catalyst is p-toluene sulfonic acid.

7. The process of claim 1, wherein the α-mercaptooxo compound is selected from the group consisting of 2-mercaptopentanone-(3), 1-phenyl-2-mercaptopropanone-(1) and 2-mercaptocyclopentanone-(1).

8. The process of claim 1, wherein the thiirane is selected from the group consisting of ethylene sulfide, propylene sulfide, cyclohexene sulfide and 2-diethylaminomethylthiirane.

9. The process of claim 1, which includes the step of connecting the 2,3-dihydro-p-dithiin to the corresponding sulfone or sulfoxide compound by reacting said dithiin with an oxidizing agent.

10. The process of claim 1, wherein said addition product is directly passed to cyclization after distilling off the said solvent.

References Cited

Tarbell et al.: Chem. Revs. 49: 18–22 (1951).
Reid: Organic Chemistry of Bivalent Sulfur, vol. III (Chem. Pub. Co., N.Y., 1960), pp. 16–18 and 25.
Bateman et al.: Chem. Abs. 47:3847 (April 1953).
Parham et al.: J.A.C.S.., 74: 1824–6 (April 1952).

HENRY R. JILES, Primary Examiner
C. M. S. JAISLE, Assistant Examiner

U.S. Cl. X.R.
252—406